United States Patent [19]

Kimura

[11] Patent Number: 4,818,175
[45] Date of Patent: Apr. 4, 1989

[54] EXPANDABLE AND CONTRACTIBLE ARMS

[75] Inventor: Motohiko Kimura, Yokohama, Japan

[73] Assignee: Kabushiki Kaisha Toshiba, Kawasaki, Japan

[21] Appl. No.: 940,941

[22] Filed: Dec. 12, 1986

Related U.S. Application Data

[62] Division of Ser. No. 643,793, Aug. 24, 1984, Pat. No. 4,712,969.

[30] Foreign Application Priority Data

Aug. 29, 1983 [JP] Japan .................. 58-157475
Mar. 31, 1984 [JP] Japan .................. 59-64880

[51] Int. Cl.⁴ .................................. B25J 17/00
[52] U.S. Cl. .................... 414/730; 74/89.15; 403/60; 403/77; 901/14; 901/23; 901/28
[58] Field of Search ............... 414/4, 728, 730, 735; 901/14, 19, 23-24, 27-28; 74/89.15, 424.8 R; 403/60, 61, 77, 74

[56] References Cited

U.S. PATENT DOCUMENTS

| 2,766,079 | 10/1956 | Browne | 403/77 X |
| 3,371,551 | 3/1968 | Profet | 74/424.8 R |
| 3,395,436 | 8/1968 | Sullivan | 403/77 X |
| 3,404,580 | 10/1968 | Valenti | 74/424.8 R |
| 3,404,581 | 10/1968 | Kraus | 74/424.8 R |
| 3,438,661 | 4/1969 | Bowen III | 403/77 |

FOREIGN PATENT DOCUMENTS

| 112099 | 6/1984 | European Pat. Off. | 901/23 |
| 393083 | 12/1973 | U.S.S.R. | |
| 422580 | 9/1974 | U.S.S.R. | |
| 697315 | 11/1979 | U.S.S.R. | |
| 1222538 | 4/1986 | U.S.S.R. | 901/27 |

Primary Examiner—Robert J. Spar
Assistant Examiner—P. McCoy Smith
Attorney, Agent, or Firm—Foley & Lardner, Schwartz, Jeffery, Schwaab, Mack, Blumenthal & Evans

[57] ABSTRACT

An expandable and contractable arm is constituted by a plurality of expandable and contractable units and connecting devices including universal joints for serially interconnecting the units into the arm. Each unit includes at least three expandable and contractable operating members in the form of link mechanisms or double thread type expandable and contractable rods, and actuating devices for equally or unequally expanding and contracting the operating members so as to increase or decrease distances between the connecting members while maintaining them in parallel or inclined with respect to each other.

6 Claims, 6 Drawing Sheets

FIG. 10
(a)
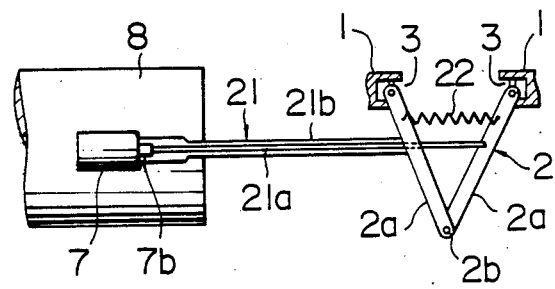
(b)
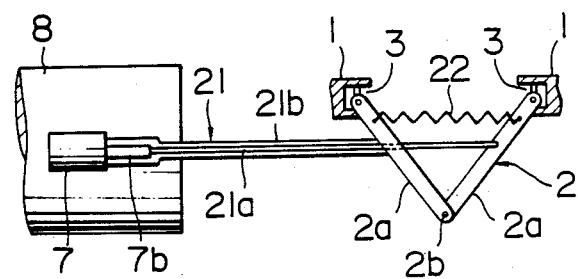
FIG. 11
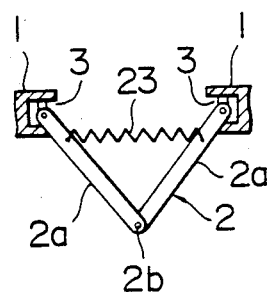

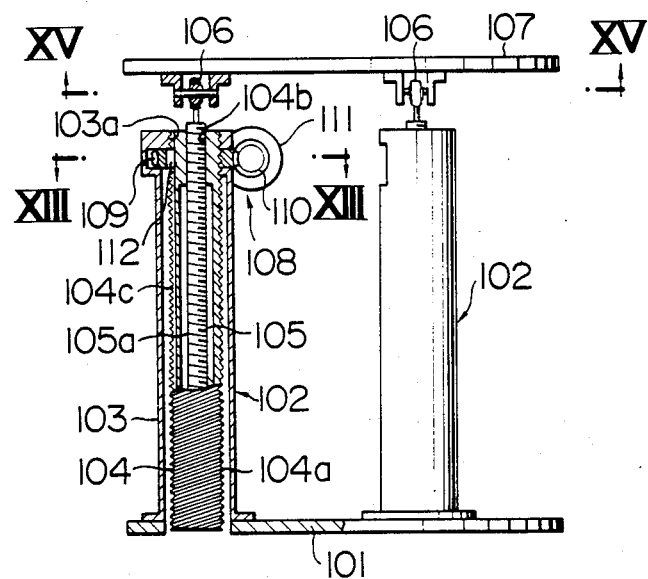
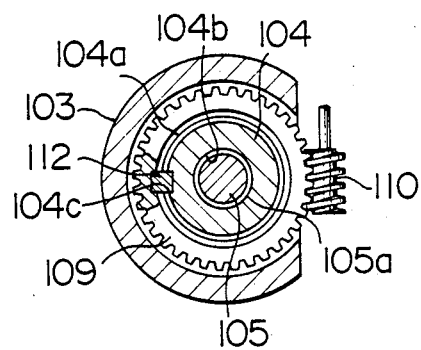
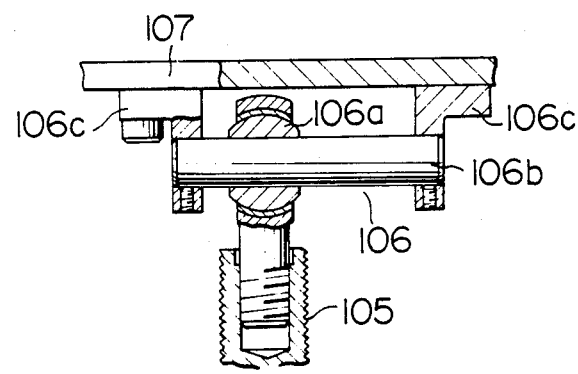

EXPANDABLE AND CONTRACTIBLE ARMS

This is a division of application Ser. No. 6743,793, now U.S. Pat. No. 4,712,969, filed Aug. 24, 1984.

BACKGROUND OF THE INVENTION

This invention relates to an expandable, contractable and bendable arm.

In recent years, in nuclear reactors and many other industries, it has been desired to maintain, inspect and measure various parts from a remote place for avoiding danger of irradiation of radioactive substances, and for saving power.

To effect such remote operation, according to a prior art method, a manipulator or other operating device is mounted on a carriage which is controlled remotely and after bringing the carriage to a working place the manipulator is expanded or contracted to perform desired operation.

However, the carriage cannot approach an object beyond a limit because of presence of obstacles in the working space. Moreover, as there is a limit for the length of the arm of the manipulator its workability is also limited. Further, prior art arm could not be contracted from the state in which the arm has been extended straighly, and cannot be bent.

One example of a manipulator arm which can be bent is disclosed in U.S.S.R. Inventor's Certificate No. 422580. The arm shown therein, however, cannot increase or decrease the length thereof.

SUMMARY OF THE INVENTION

It is an object of this invention to provide an improved expandable and contractible arm which can be expanded and contracted straightforwardly and can be bent in any direction.

According to this invention there is provided an expandable and contractible arm comprising a plurality of expandable and contractible units and connecting means including universal joints for serially interconnecting the units into the arm, each of the units including at least three expandable and contractible members, and means for equally or unequally expanding and contracting the members so as to increase or decrease distances between the connecting members while maintaining them in parallel or inclined with respect to each other.

BRIEF DESCRIPTION OF THE DRAWINGS

In the accompanying drawings:

FIGS. 8, 9, 10a, 10b and 11 show side views of other modifications of this invention;

FIG. 12 is a side view, partly in section, showing a modified arm unit including three sets of double thread type expandable and contractable rods;

FIG. 13 is a sectional view taken along a line XIII—XIII in FIG. 12;

FIG. 14 is a sectional view showing a universal joint utilized in the arm unit shown in FIG. 13;

DESCRIPTION OF THE PREFERRED EMBODIMENTS

Figure 1:
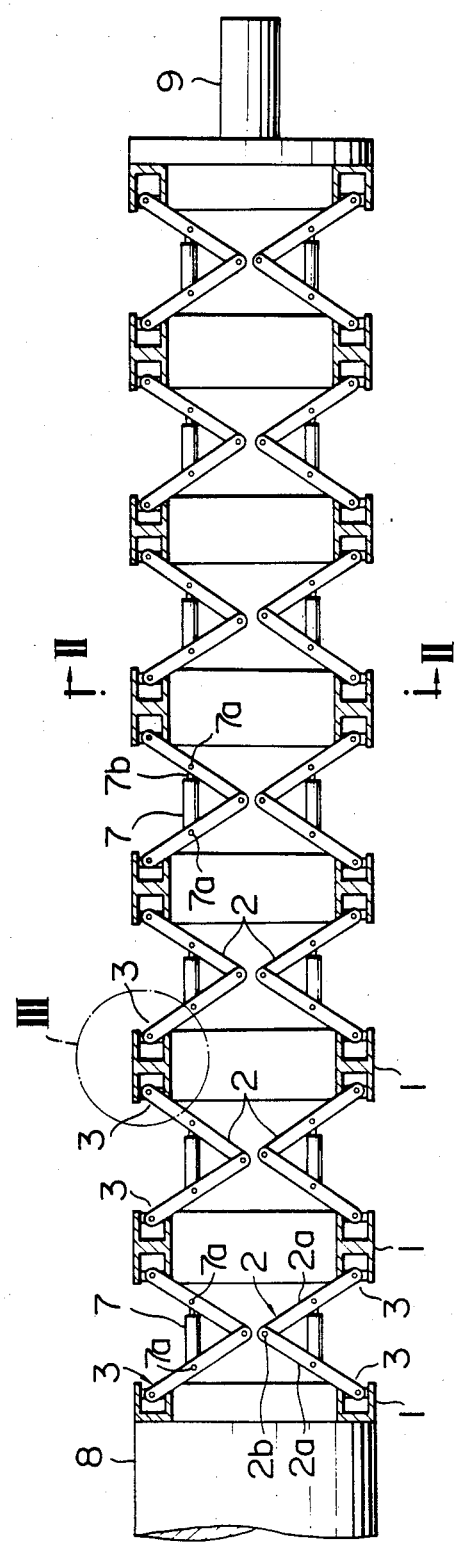
FIG. 1 is a longitudinal sectional view, taken along a line I—I in FIG. 2 showing one embodiment of the expandable and contractable arm according to this invention, the arm being in a contracted state.
Figure 2:
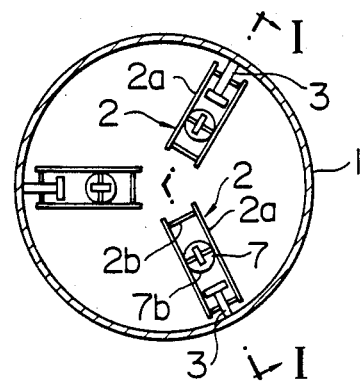
FIG. 2 is a cross-sectional view taken along a line II—II in FIG. 1.
Figure 3:
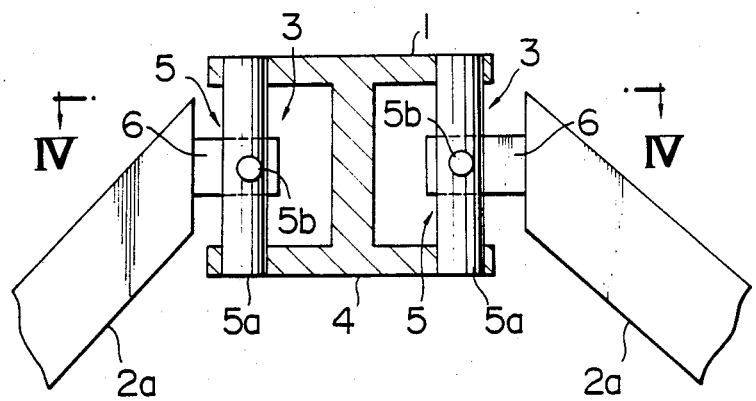
FIG. 3 is an enlarged sectional view of a portion shown in FIG. 1 bounded by a circle III.
Figure 4:
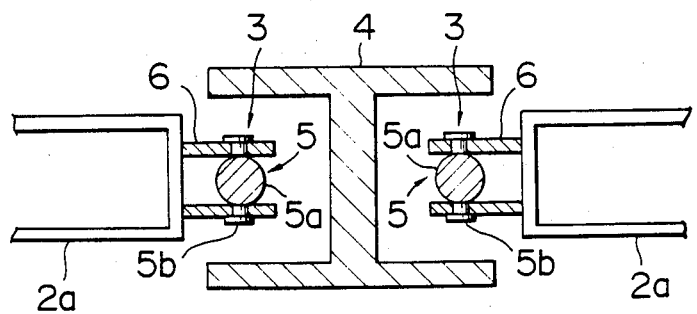
FIG. 4 is a sectional view taken along a line IV—IV in FIG. 3.

FIGS. 1 through 6 show a first embodiment of this invention. As shown in FIGS. 1 and 2 according to this embodiment, a plurality of (in this example 8) short cylindrical or annular members 1 are arranged in an axial direction and adjacent annular members 1 are interconnected by at least 3 link mechanisms 2 which are equally spaced in the circumferential direction as shown in FIG. 2. Each link mechanism 2 comprises a pair of links 2a pivotally connected by a pivot pin 2 so as to vary the angle between two links, in other words to expand and contract the arm. As shown in FIG. 2, the link mechanisms 2 extend in the radial direction from the center of the annular member 1. The outer ends of respective links 2a are connected to the inner surface of respective annular members 1 through flexible or universal couplings 3. As shown in FIGS. 3 and 4, each flexible coupling 3 is provided with a holder 4 projecting inwardly from the annular member 1 and criss-cross shaped pins 5 with their radial pins 5a pivotally connected to the holder 4. Connecting members 6 projecting from the ends of links 2a are pivotally connected to the circumferential pins 5b of the criss-cross shaped pins 5. With this construction, each link 2a can incline in any direction. A piston-cylinder assembly 7 is connected between two links 2a of each link mechanism through pivot pins 7a for expanding and contracting the link. The annular member 1 at one end of the arm is secured to a stationary member 8, while the annular member 1 at the opposite end is secured to a detector 9 or any member to be manipulated by the arm.

The embodiment shown in FIGS. 1-4 operates as follows. While the arm is in the contracted state as shown in FIG. 1, pressurized fluid is supplied to respective piston-cylinder assemblies 7 to cause their pistons 7b to project whereby respective links 2a are gradually expanded to elongate the arm.

Figure 5:
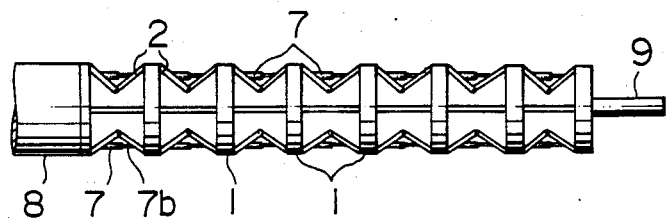
FIG. 5 is a side view of the arm shown in FIG. 1 in its expanded state.

At this time, when three piston-cylinder assemblies 7 which are disposed at equal spacing in the circumferential direction are expanded by equal amount, the arm will be expanded linearly as shown in FIG. 5.

Figure 6:
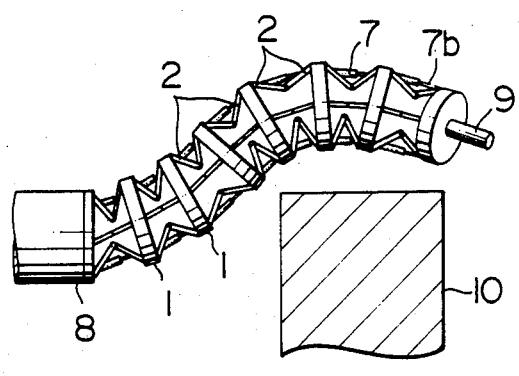
FIG. 6 is a side view of the arm when it is bent in various directions.

When the three piston-cylinder assemblies are expanded unequally the arm could be bent in any desired direction as shown in FIG. 6, whereby the arm can extend above an obstacle 10.

The arm can be contracted by retracting pistons 7 of the piston-cylinder assemblies.

As above described the arm of this embodiment not only can expand and contract straightforwardly but also can bend in any direction.

Figure 7:
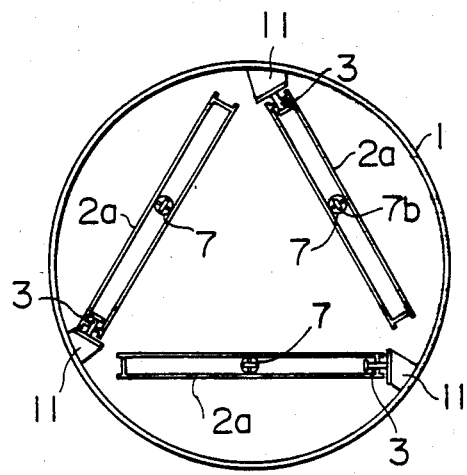
FIG. 7 is a cross-sectional view showing a modified embodiment of this invention in which three link mechanisms are arranged in an equilateral triangular configuration.

FIG. 7 shows a modified embodiment of this invention in which three link mechanisms are arranged in an equilateral triangle.

More particularly, three flexible joints 3 are secured at an equal spacing to the inner surface of the annular member 1 through brackets 11 and each link mechanism 2 is connected to each flexible joint 3 so as to form one side of the equilateral triangle. In this modification too, the arm can be contracted or expanded by actuating the pistons 7b of respective piston-cylinder assemblies. To relatively incline adjacent ring members 1, three link mechanisms 2 are sufficient, but if desired, the number of the link mechanisms can be increased to four or more.

Figure 8:
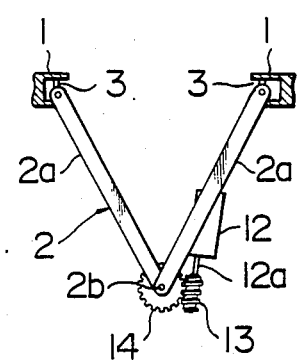

FIG. 8 shows another modification of the arm wherein an electric motor 12 is secured to an intermediate point of one link 2a, and a worm 13 secured to the motor shaft 12a is disposed to mesh with a worm wheel 14 mounted on one end of the other link 2a concentric with a pivot pin 2b.

In this modification, as the motor 12 rotates in the forward or reverse direction, the worm wheel is rotated in the forward or reverse direction so as to change the angle subtended by links 2a, thus varying the spacing between adjacent annular members 1. Furthermore, according to this modification, the extent of expansion and contraction of the arm can be more finely adjusted than the previous embodiment by controlling the number of revolutions of the motor 12.

Figure 9:
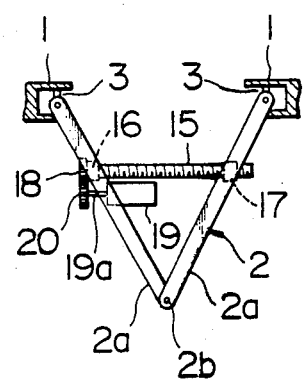

FIG. 9 shows still another modification of the arm of this invention is which a threaded rod 15 is threaded through intermediate portions of respective links 2a. One end of the threaded rod 15 is rotatably supported by a ball bearing 16 and the other end is threaded through a ball bearing shaped nut 17. A gear 18 secured to the threaded nut 15 is driven by an electric motor 19 through the output shaft 19a thereof and a gear 20, the motor 19 being secured to link 2a.

In the same manner, the angle subtended by links 2a can be varied by rotating the motor 19 in the forward or reverse direction.

FIGS. 10a and 10b show yet another embodiment of this invention in which a piston-cylinder assembly 7 is provided for a stationary member 8 and a flexible composite wire 21 is provided between the piston-cylinder assembly 7 and the links 2a. More particularly, the inner wire 21a of the composite wire is connected between the piston 7b and a far side link 2a while the outer wire 21b is connected between the stationary member 8 and the near link 2a. Furthermore, a compression spring 22 is interposed between the links 2a.

When the piston 7b is retracted against the force of the compression spring 22, the spacing between adjacent ring members 1 is decreased as shown in FIG. 10a, whereas when the piston 7b is protruded, the spacing is increased as shown in FIG. 10b. In this modification, since the piston-cylinder assembly is secured to the stationary member 8, it is possible to decrease the weight of the arm than previous embodiments.

In another modification as shown in FIG. 11, a spring made of a shape memory alloy is connected between adjacent links 2a and the temperature of the spring is controlled by a heating element, not shown, to vary the length of the spring so as to open and close the links.

In the following embodiments double thread type expandable and contractable levers are substituted for theh link mechanism for attaining the same object.

FIG. 12 shows one unit of a modified expandable and contractable arm of this invention. A plurality of units are connected in series to constitute an arm that can expand and contract straightforwardly or bend in any direction. The unit shown in FIG. 12 comprises a circular base plate 101 and three or more sets of vertically extending double thread type expandable and contractible levers 102 are secured to the base plate 101 at equal circumferential spacings. Each lever 102 comprises a stationary cylinder 103 secured to the lower base plate 101, a first threaded rod 104 and a second threaed rod 105. A circular upper base plate 107 is pivotally connected to the upper end of the second threaded rod 105 through a flexible or universal joint 106. A mechanism 108 for expanding and contracting threaded rods 104 and 105 is provided for the upper end of each lever 102.

Figure 15:
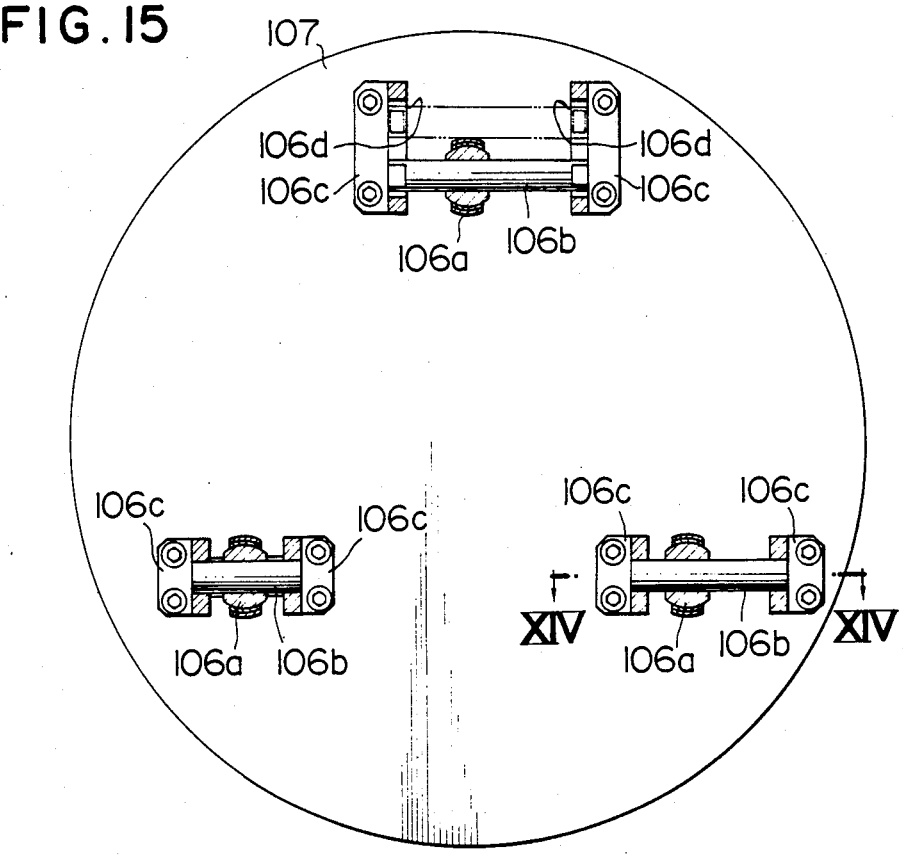
FIG. 15 is an enlarged sectional view taken along a line XV—XV in FIG. 12.
Figure 16:
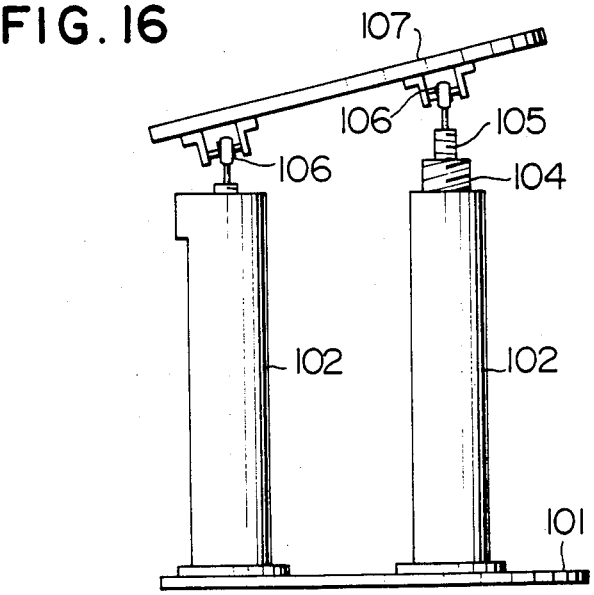
FIG. 16 is a side view of the arm unit shown in FIG. 12 in which the upper base plate is inclined.

More particularly, the first threaded rod 104 takes the form of a hollow cylinder and its male thread 104a engages female thread 103a formed on the inside of the stationary cylinder 103. The male thread 105a engages the female thread 104b formed on the upper inner surface of the first threaded rod 104. As shown in FIG. 13, an axial key slot 104c is provided for the first threaded rod 104. The drive mechanism 108 comprises a worm wheel 109 surrounding the first threaded rod 104 with a small gap to rotate freely, a worm 110 meshing with the worm wheel 109 and a reversible motor 111. As shown in FIG. 13 the worm wheel 109 and the first threaded rod 104 are coupled together by a key 112 received in the key slot 104c. As shown in FIG. 14, the flexible joint 106 comprises a ball joint 106a secured to the upper end of the second threaded rod 105, a pin 106b slidably extending through the ball joint 106a, and L shaped flanges 106c depending from the lower surface of the upper base plate 107 to support the opposite ends of the pin 106b. As shown in FIG. 15, three pins 106b are disposed in parallel and the uppermost pin 106b, as viewed in FIG. 15, is supported by slots 106d, of the flanges 106c to be movable in a direction perpendicular to the pin 106b. The reason for providing slots 106d for only the uppermost pin 106b is to permit the upper base plate 107 to incline as shown in FIG. 16 when only the uppermost expandable and contractable double thread lever 102 is expanded.

The upper and lower base plates 107 and 101 of adjacent arm units are connected together by suitable means to form an integral disc corresponding to the circular member 1 shown in FIG. 1, thus completing an expandable and contractabe arm capable of operating in the same manner as that shown in FIG. 1.

More particularly, when the motors 110 of respective drive mechanism 108 are rotated in the same direction for the same time, all threaded rods 105 of respective arm units are elongated or contracted by the same amount so that the arm as a whole is expanded or contracted straightforwardly with upper and lower base plates 107 and 101 maintained in parallel as shown in FIG. 12.

To incline the upper base plate 107, that is to bend the arm, the motors 111 for respective units are operated for different time or at different speed. As the upper base plate 107 is inclined the ball joint 106a slides along the pin 106b to absorb variation in the difference of the distance between the axes of pins 106b. As above described since one of the pins 106b is slidably received in slots 106d of the flanges 106c, this arrangement also absorbs the variation in the distance between axes. In this manner, the arm can bend in any direction.

As above described, the arm o this invention can not only expand and contract straightforwardly but also can bend in any direction, so that a detector or tool secured to the free end of the arm can readily be brought into its working position through a narrow passage.

What is claimed is:

1. An expandable and contractible arm comprising:
   a plurality of serially connected, independently expandable and contractible units, each unit comprising:
   (a) a lower base plate connected to a first end of each of at least three independently expandable and contractible double thread levers,
   (b) an upper base plate,
   (c) means for connecting a second end of each of said at least three expandable and contractible double thread levers to said upper base plate, said connecting means comprising:
      (i) a ball joint secured to each double thread lever second end,
      (ii) a pin slidably extending through each ball joint, and
      (iii) each pin being received by a respective pair of L-shaped flanges each depending from a lower surface of said upper base plate, one pair of said flanges each having a slot disposed therein, each said slot supporting an end of said respective pin, whereby said pin is slidable within said slot in a direction perpendicular to the length of said pin, and
   (d) means for independently expanding and contracting each of said at least three expandable and contractible double thread levers to so as to expand and contract each said unit independently from another said unit when said expanding and contracting means within said unit are operated equally, and so as to bend each said unit independently from another said unit when said expanding and contracting means within said unit are operated unequally.

2. The arm according to claim 1, wherein said at least three independently expandable and contractible double thread levers are connected to said lower base plate at equal circumferential spacings.

3. The arm according to claim 1, further comprising a stationary member secured to a first said unit and a manipulatable member secured to an end said unit.

4. The arm according to claim 1, wherein said expandable and contractible double thread lever comprises:
   (a) a stationary cylinder having inner threads and being secured to said lower base plate,
   (b) a movable cylinder disposed within said stationary cylinder, said movable cylinder having inner threads and outer threads, said movable cylinder outer threads engaging said stationary cylinder inner threads, and
   (c) a rod having an upper end connected to said connecting means and being disposed within said movable cylinder, said rod having outer threads engaging said movable cylinder inner threads.

5. The arm according to claim 4, wherein said expanding and contracting means further comprises:
   (a) a worm wheel rotatably disposed within a circumferential slot of said stationary cylinder,
   (b) means for engaging said worm wheel with said movable cylinder, and
   (c) means including a reversible motor for driving said worm wheel.

6. The arm according to claim 1, wherein opposite ends of said pin are received in said slots formed in said pair of L-shaped flanges of one of said expandable and contractable double thread levers, to be slidable within said slots in a direction perpendicular to the length of said pin.

* * * * *